US011623859B2

(12) United States Patent
Knoble (10) Patent No.: US 11,623,859 B2
(45) Date of Patent: Apr. 11, 2023

(54) APPARATUS AND METHOD FOR DECONSTRUCTING MATTRESSES (71) Applicant: Atlanta Attachment Company, Lawrenceville, GA (US)

(72) Inventor: Jesse Knoble, Soldiers Grove, WI (US)

( * ) Notice: Subject to any disclaimer, the term of this patent is extended or adjusted under 35 U.S.C. 154(b) by 0 days.

(21) Appl. No.: 17/402,485

(22) Filed: Aug. 13, 2021

(65) Prior Publication Data

US 2022/0048757 A1 Feb. 17, 2022

Related U.S. Application Data (60) Provisional application No. 63/065,655, filed on Aug. 14, 2020, provisional application No. 63/065,650, filed on Aug. 14, 2020, provisional application No. 63/065,645, filed on Aug. 14, 2020.

(51) Int. Cl.
*B68G 15/00* (2006.01)
*A47C 27/06* (2006.01)

(52) U.S. Cl.
CPC .......... *B68G 15/005* (2013.01); *A47C 27/064* (2013.01)

(58) Field of Classification Search
CPC ....... A47C 27/064; B68G 15/005; B68G 9/00
See application file for complete search history.

(56) References Cited

U.S. PATENT DOCUMENTS

| 8,286,337 B2 * | 10/2012 | Mills | B68G 15/00 29/709 |
| 9,321,138 B2 * | 4/2016 | Gilbert | B30B 9/326 |
| 2011/0197436 A1 * | 8/2011 | Rudolf | B26D 7/18 29/700 |
| 2016/0264397 A1 * | 9/2016 | Wagenaar | B26D 3/282 |
| 2017/0216980 A1 * | 8/2017 | Oettinger | B09B 3/00 |

FOREIGN PATENT DOCUMENTS

| AU | 2010100054 A4 | 3/2010 | |
| CN | 109732703 A * | 5/2019 | |
| DE | 102005030765 B3 | 11/2006 | |
| JP | H0810639 A * | 1/1996 | B09B 5/00 |
| JP | 2004229946 A | 8/2004 | |
| WO | WO2009/018600 A1 | 2/2009 | |
| WO | WO2012/042156 A1 | 4/2012 | |

OTHER PUBLICATIONS

CN-109732703-A machine translation (Year: 2019).*
JPH0810639A machine translation (Year: 1996).*
International Search Report and Written Opinion of the International Searching Authority for PCT/US21/46042, dated Jan. 6, 2022.

* cited by examiner

*Primary Examiner* — Michael W Hotchkiss
(74) *Attorney, Agent, or Firm* — Womble Bond Dickinson (US) LLP

(57) ABSTRACT

A method and apparatus for deconstructing a mattress of the type having steel coil springs held within fabric pockets. The apparatus includes a frame and an opener mechanism mounted to the frame and operable for opening a plurality of fabric pockets at a first end thereof to create an opening in the first end of the fabric pockets and expose the steel coil springs contained therewithin. A gripper mechanism is provided for gripping the plurality of fabric pockets at a second end thereof, opposite the first end. An extractor mechanism is mounted to the frame for extracting the steel coil springs from the fabric pockets through the openings formed in the first end of the fabric pockets.

20 Claims, 13 Drawing Sheets

APPARATUS AND METHOD FOR DECONSTRUCTING MATTRESSES

CROSS-REFERENCE TO RELATED APPLICATIONS

The present application claims the priority benefit of U.S. provisional applications Ser. Nos. 63/065,645, 63/065,655, and 63/065,650, all filed on Aug. 14, 2020.

TECHNICAL FIELD

The present invention relates generally to recycling and, in particular, to deconstructing certain types of mattresses for recycling same.

BACKGROUND

Mattresses have been constructed in many ways over the years. Some without any springs, while others have had springs extending laterally for helping to support users sleeping atop the mattresses. In recent years, the so-called pocket coil spring mattress has begun to become more and more popular.

Pocket coils or pocketed coils (also known as Marshall Coils) are a popular construction type for inner spring mattresses because they isolate the transfer of movement to individual coils. Mattresses with pocket coils often have between 250 and 1,000 individual spring coils. These metal coils are individually encapsulated in either polypropylene or woven cotton fabric. The coil jackets in some constructions are bound together using stitching or hot melt adhesives. In some other constructions, the coil jackets are not connected, resting freely inside the mattress walls.

Pocketed coils are springs wrapped individually in a fabric sleeve and are popular with consumers because the springs react to pressure independently. This construction minimizes movement and allows for a more buoyant feel. At the end of their product life, however, pocketed coil layers have proven difficult to recycle. MRC estimates that pocket coil mattresses represent at least 25% of the current recycling stream. Given the popularity of this construction in recent years, the percentage of pocketed coil mattresses is steadily increasing.

When a mattress is deconstructed, the pocketed coil layer is easily separated from other components, but it is impractical to manually cut the fabric sleeves to remove the metal coils inside. Despite pocketed coils containing over 90% metal, most metal recyclers will not accept them due to the fabric contamination. As a result, pocketed coil units are sent to a landfill unless the recycler can separate the components. Since most metal recyclers will not tolerate fabric contamination, the pocket coil units are often sent to landfills.

However, mattresses with pocketed coils are burdensome to landfills because they create problems for the landfill machinery. As a result, there is a growing trend for landfills operators to reject mattresses with pocketed coils, leading to a growing disposal/recycling problem.

Accordingly, it can be seen that needs exist for an improved method and apparatus to separate the pocket fabric from the metal coil springs effectively and economically, preferably without sacrificing the revenue potential of each component. It is to the provision of such solutions to these and other problems that the present invention is primarily directed.

SUMMARY

Generally described, the present invention relates to methods and apparatuses for deconstructing mattresses of the type having steel coil springs secured within fabric pockets in order to remove and separate the steel coil springs from the fabric pockets.

In a first example embodiment, the invention relates to an apparatus for deconstructing a mattress of the type having steel coil springs held within fabric pockets. The apparatus includes a frame and an opener mechanism mounted to the frame and operable for opening a plurality of fabric pockets at a first end thereof to create an opening in the first end of the fabric pockets and expose the steel coil springs contained therewithin. A gripper mechanism is provided for gripping the plurality of fabric pockets at a second end thereof, opposite the first end. An extractor mechanism is mounted to the frame for extracting the steel coil springs from the fabric pockets through the openings formed in the first end of the fabric pockets.

Preferably, the gripper mechanism includes a gang of rotatable corkscrew-like elements and a drive for driving the rotatable corkscrew-like elements in rotation into the second end of the fabric pockets.

Preferably, the opener mechanism is mounted to the frame for longitudinal movement along the frame and includes a high-speed rotating blade mounted for side to side movement across the frame to engage a row of fabric pockets one after another.

Preferably, the apparatus also includes a gauging mechanism for adjusting the spacing of the gang of rotatable corkscrew-like elements to adjust the gripper mechanism to match the coil spacing of a particular mattress. Optionally, the gauging mechanism includes a pantograph mechanism for adjusting the spacing of the corkscrew-like elements while keeping the spacing consistent from one corkscrew-like element to the next.

Also, preferably the apparatus includes a support platform mounted to the frame for movably supporting a mattress thereupon for processing, and the gripper mechanism is mounted above the platform and the opener mechanism is mounted below the platform.

Preferably, the extractor mechanism operates to pull the steel coil springs downwardly through the openings formed in the fabric pockets by the opener mechanism.

Optionally, the extractor mechanism includes an elongate element for engaging the steel coil springs and wherein the elongate element is mounted for movement away from the fabric pockets to pull the steel coil springs out of the fabric pockets as a group. In one example, the elongate element is a blade-like element.

Preferably, the apparatus is configured for indexing the position of the mattress being deconstructed to present a first row of fabric pockets and steel coil springs for processing, and after removing the steel coil springs from the first row, indexing the position of the mattress again to present a subsequent row of fabric pockets and steel coil springs for processing, and continuing to process the fabric pockets and steel coil springs and indexing the position of the mattress until there are no further rows of fabric pockets and steel coil springs remaining to be processed.

Optionally, a jam detector is mounted to the frame for detecting the presence of a coil spring in a location likely to cause a jam. In one example form, the jam detector includes a swinging arm that sweeps through an arc to detect a steel coil spring in its path where one shouldn't be.

Optionally, the mattress is oriented substantially horizontally during processing and the extraction of the steel coil springs from the fabric pockets is carried out by pulling the steel coil springs downwardly, out of the fabric pockets.

In another example form, the invention relates to a method for deconstructing a mattress of the type having steel coil springs held within fabric pockets. It includes a step of opening a plurality of fabric pockets at a first end thereof to create an opening in the first end of the fabric pockets and expose the steel coil springs contained therewithin. It also includes gripping the plurality of fabric pockets at a second end thereof, opposite the first end. Also, the method includes extracting the steel coil springs from the fabric pockets through the openings formed in the first end of the fabric pockets.

Preferably, the step of opening the plurality of fabric pockets comprises cutting open the fabric pockets. Preferably, the step of opening the plurality of fabric pockets comprises cutting open the fabric pockets with a high-speed rotating blade.

Optionally, the step of gripping the fabric pockets at the second end thereof is carried out after opening the fabric pockets at the first end thereof. Optionally, the step of gripping the fabric pockets at the second end thereof is carried out before opening the fabric pockets at the first end thereof.

Preferably, the step of gripping the fabric pockets at the second end thereof includes rotating corkscrew-like implements into the second end of the fabric pockets.

Preferably, the step of extracting the steel coil springs comprises engaging the steel coil springs with a movable element and moving the movable element away from the fabric pockets to pull the steel coil springs out of the pockets.

Preferably, the method also includes the step of indexing the position of the mattress being deconstructed to present a first row of fabric pockets and steel coil springs for processing, and after removing the steel coil springs from the first row, indexing the position of the mattress again to present a subsequent row of fabric pockets and steel coil springs for processing, and continuing to process the fabric pockets and steel coil springs and indexing the position of the mattress until there are no further rows of fabric pockets and steel coil springs remaining to be processed.

Optionally, the mattress has already had an outer cover portion thereof removed to prepare the fabric pockets and steel coil springs for processing. Optionally, the mattress is oriented substantially horizontally during processing and the step of extracting the steel coil springs from the fabric pockets is carried out by pulling the steel coil springs downwardly, out of the fabric pockets.

The specific techniques and structures employed to improve over the drawbacks of the prior devices and accomplish the advantages described herein will become apparent from the following detailed description of example embodiments and the appended drawings and claims.

DETAILED DESCRIPTION OF EXAMPLE EMBODIMENTS

Generally described, the present invention relates to a method and apparatus for deconstructing certain mattresses of the type having pocketed coil springs. In the example embodiments shown and described herein, a reduced scale apparatus is depicted for simplicity of illustration. Those skilled in the art will appreciate, however, that the width of the machine would be significantly greater to accommodate an entire mattress. Indeed, the reduced scale example shown in the figures depicts processing only of a certain portion of the mattress through the machine.

Figure 1A:
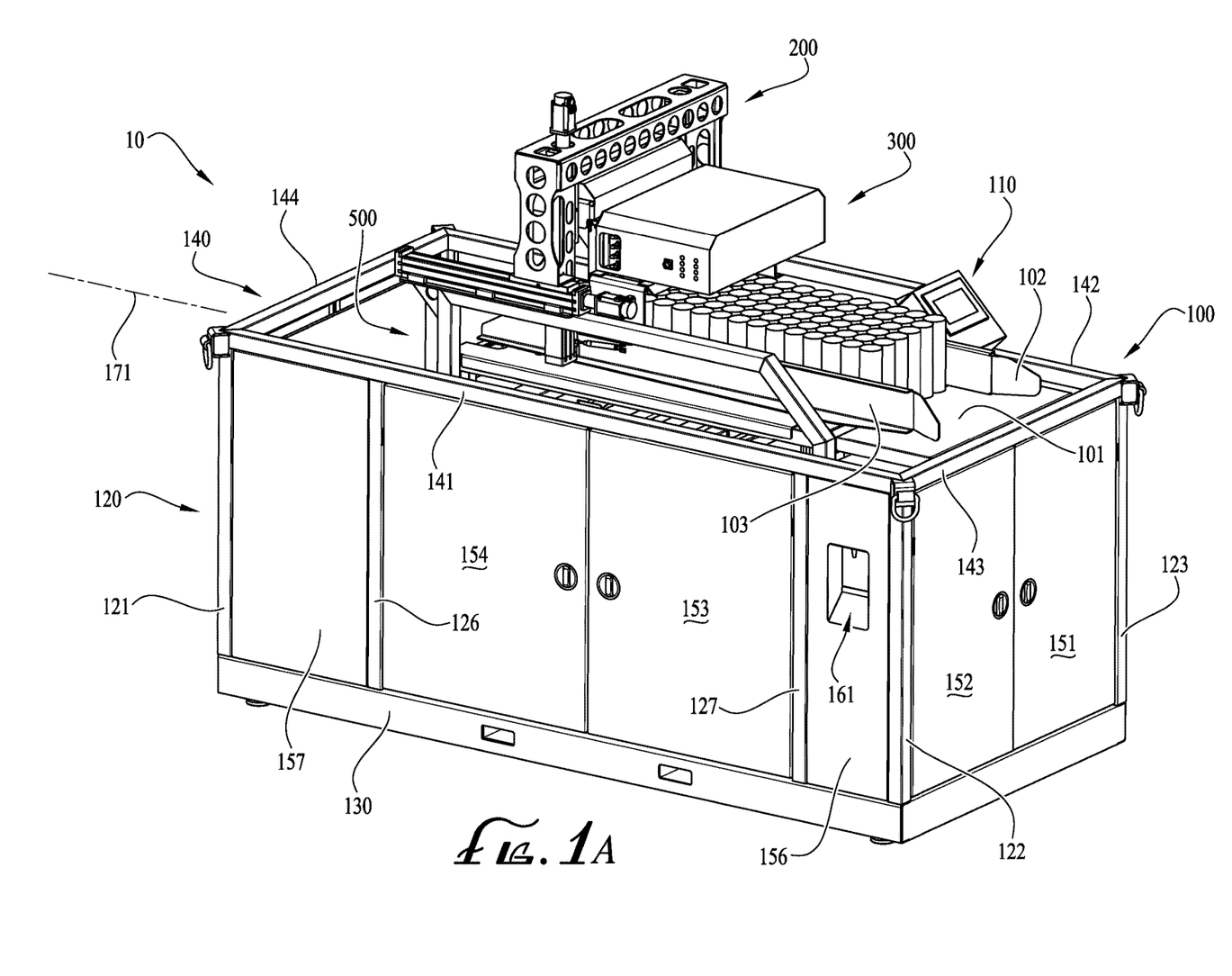
FIG. 1A is a perspective view of a mattress deconstruction apparatus according to a first example embodiment of the present invention.

Referring now first to FIG. 1A, an apparatus 10 for deconstructing a mattress is depicted. The apparatus 10 includes a frame and cabinet assembly 100, a gripper mechanism indicated generally at 200, a gauging mechanism indicated generally at 300, a cutter mechanism 400 (not generally visible in FIG. 1A, but will be seen in subsequent figures), and an extractor mechanism 500. The frame and cabinet assembly 100 includes a platform or worktable indicated generally at 101 upon which a mattress can be supported and moved thereover. The frame and enclosure 100 also includes a pair of lateral guide rails 102 and 103 which can be adjusted for width to accommodate mattresses of various widths. A human machine interface or HMI 110 is mounted to the frame and cabinet 100 and includes a display and user input to allow a user to make adjustments to the machine and control operation of machine to process mattresses.

As used herein, the term "mattress" shall be understood to encompass both a mattress which has not been processed at all and a mattress which has been partially processed to prepare it for further deconstruction. Thus, "mattress" includes an intact mattress and a partially-disassembled mattress in the form of a workpiece. In this regard, it is contemplated that many mattresses of the sort having pocketed coils also have upper and lower coverings and outer coverings which would be removed prior to processing the mattress for deconstruction with the apparatus and method of the present invention. Such upper and lower coverings and outer coverings are easily removed with traditional methods. For example, a worker can employ a knife or scissors to remove the upper and lower coverings or the outer coverings for recycling.

Still referring to FIG. 1, the frame and cabinet assembly 100 includes a perimeter frame 120 including corner stanchions 121, 122, 123, and 124. Side stanchions 126 and 127 are on one side of the cabinet and frame, while another pair of side stanchions is on the other side of the cabinet and frame, but unseen in this illustration. A base 130 is connected to and supports the upright stanchions. An upper perimeter frame 140 includes side frame rails 141 and 142, along with end rails 143 and 144. Lifting hooks or eyelets are positioned at the top corners of the corner stanchions 121-124.

The cabinet and frame assembly 100 also includes movable doors 151 and 152, movable doors 153 and 154, and solid panels 156 and 157. Solid panel 156 includes a recess or pocket 161 for connecting an air hose to an air supply coupling positioned in the pocket.

Figure 1B:
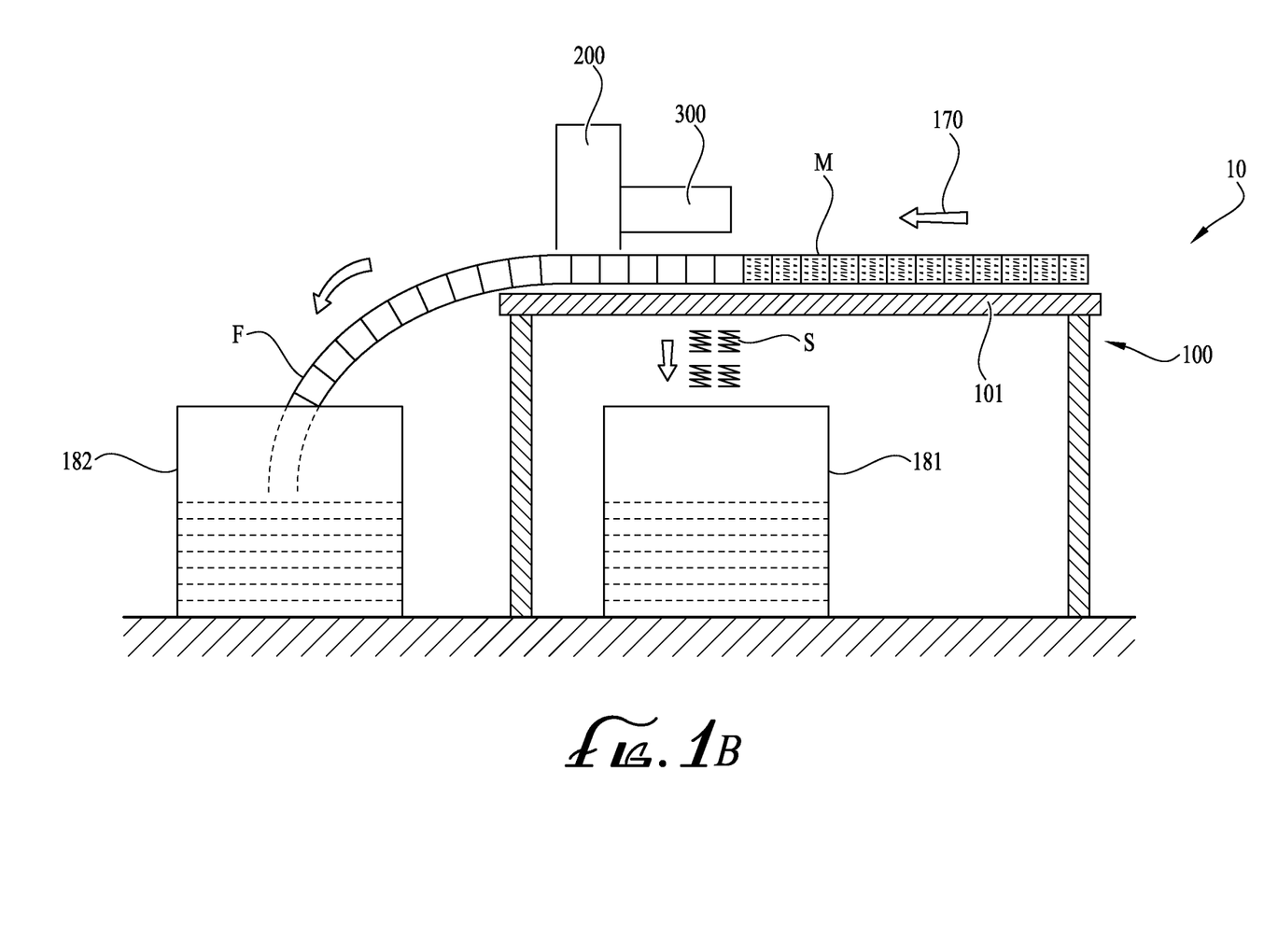
FIG. 1B is a schematic view of the mattress deconstruction apparatus of FIG. 1A, showing a process flow aspect thereof.

Reference is now made to FIG. 1B which illustrates, schematically, the overall process flow when the apparatus 10 is in use. Consideration of the overall process flow as shown in this figure will help the reader to quickly appreciate the construction details of the example apparatus depicted in the subsequent figures and described herein. As depicted in this figure, a mattress M is being processed by being deconstructed into its constituent parts. As the mattress M is moved in the direction of direction arrow 170, it is separated into steel coil springs and fabric, such as coil springs S and fabric F. Here, the mattress is shown as being supported on the platform or table 101 and moving through the apparatus 10 beneath the gripper mechanism 200 and the gauging mechanism 300. The cutter mechanism 400 and the extractor mechanism 500 are not depicted in this figure for clarity of illustration. But those elements also cooperate with the gripper mechanism 200 to extract the coil springs S from the mattress M and allow the coil springs S to drop into a receptacle 181 for collection and subsequent removal. Meanwhile, the fabric F, which had been formed into pockets containing coil springs, moves as a web of fabric into a second receptacle 182 for subsequent removal.

Figure 2A:
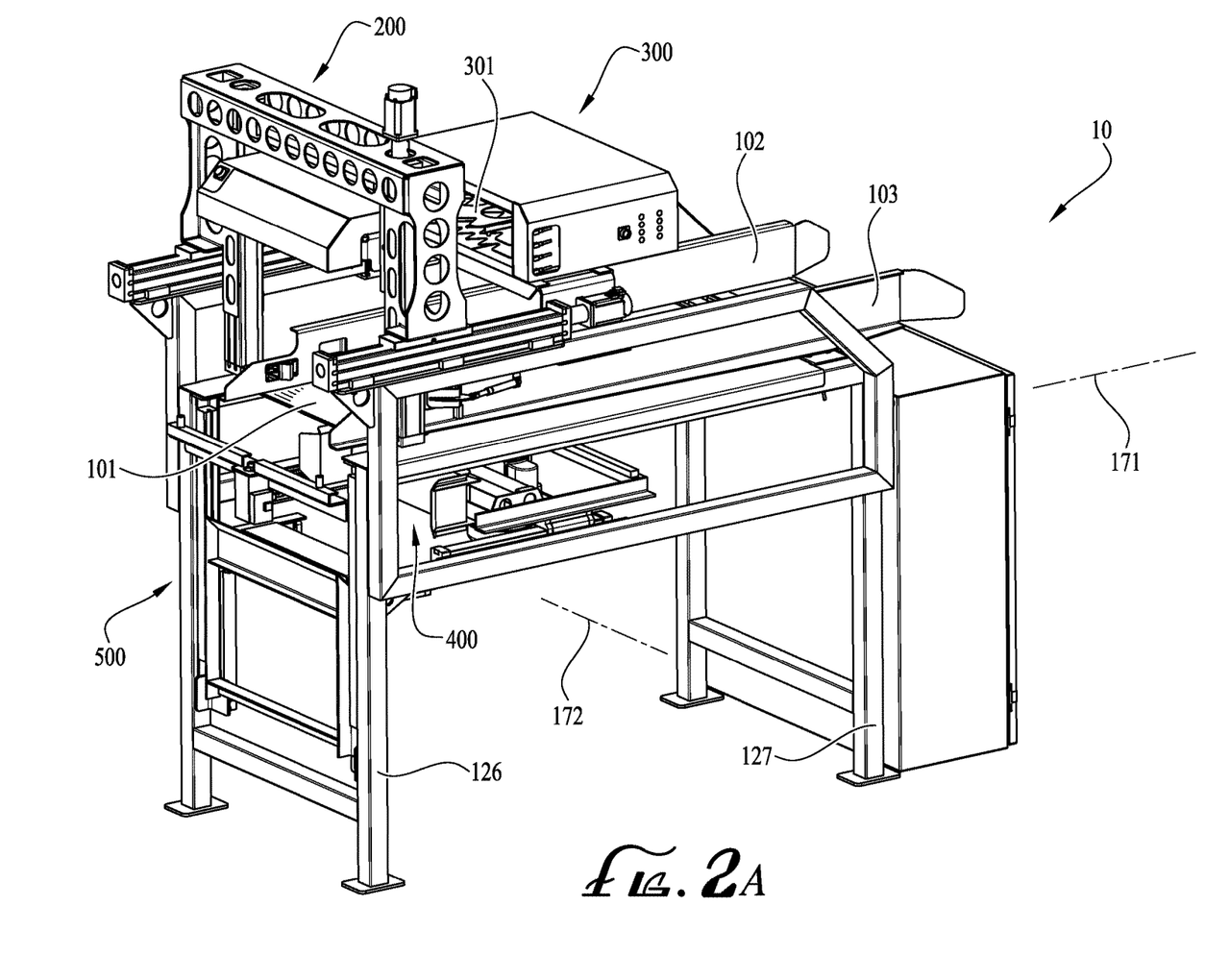
FIG. 2A is a perspective view of the mattress deconstruction apparatus of FIG. 1A, with some elements removed for illustrative purposes.
Figure 2B:
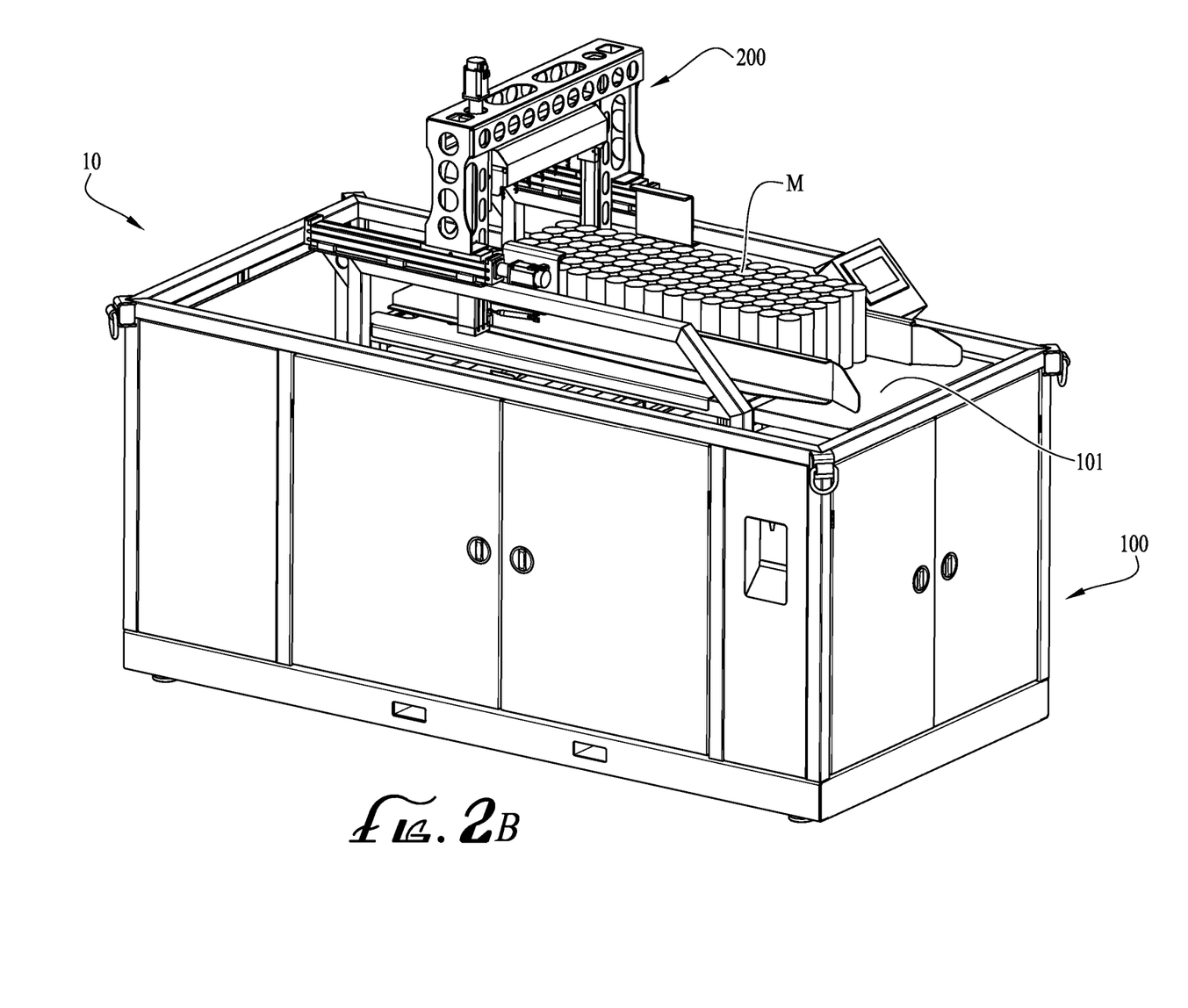
FIG. 2B is a perspective view of the mattress deconstruction apparatus of FIG. 1A, with some other elements removed for illustrative purposes.
Figure 3:
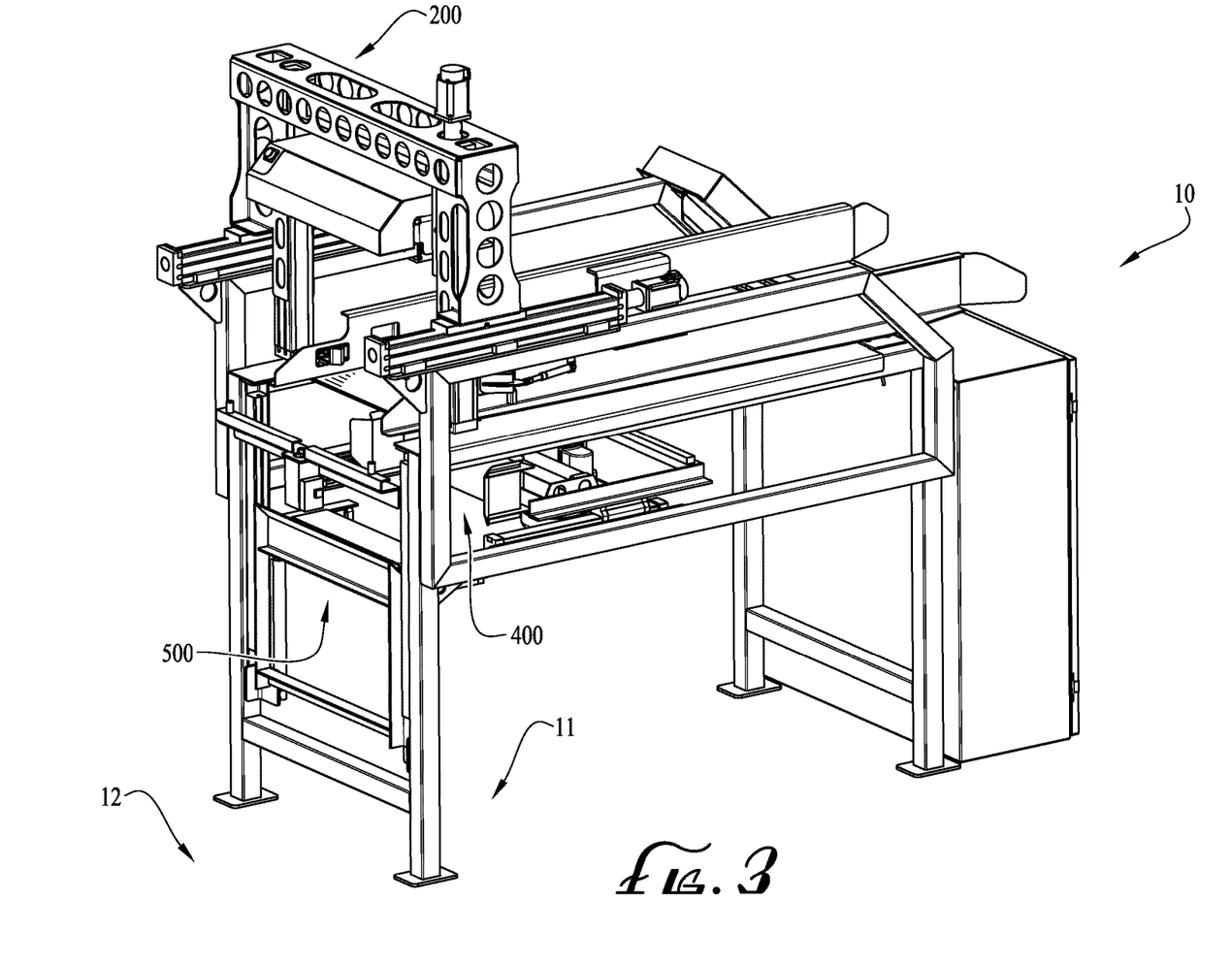
FIG. 3 is a perspective view of the mattress deconstruction apparatus of FIG. 1A, with still other elements removed for illustrative purposes.

Referring now to FIG. 2A, the apparatus 10 for deconstructing a mattress is depicted with certain elements removed to illustrate otherwise hidden elements. The figure shows the apparatus 10, a gripper mechanism indicated generally at 200, the gauging mechanism indicated generally at 300, the cutter mechanism 400, and the extractor mechanism 500. FIG. 2B is a perspective view of the mattress deconstruction apparatus 10, but with the gauging mechanism 300 removed for illustrative purposes. FIG. 3 is also a perspective view of the mattress deconstruction apparatus 10, but with the gauging mechanism 300 removed for illustrative purposes. This figure shows a first location 11 where a first receptacle 181 can be positioned for collecting separated steel coil springs and a second location 12 where a second receptacle 182 can be positioned for collecting separated fabric.

Figure 4A:
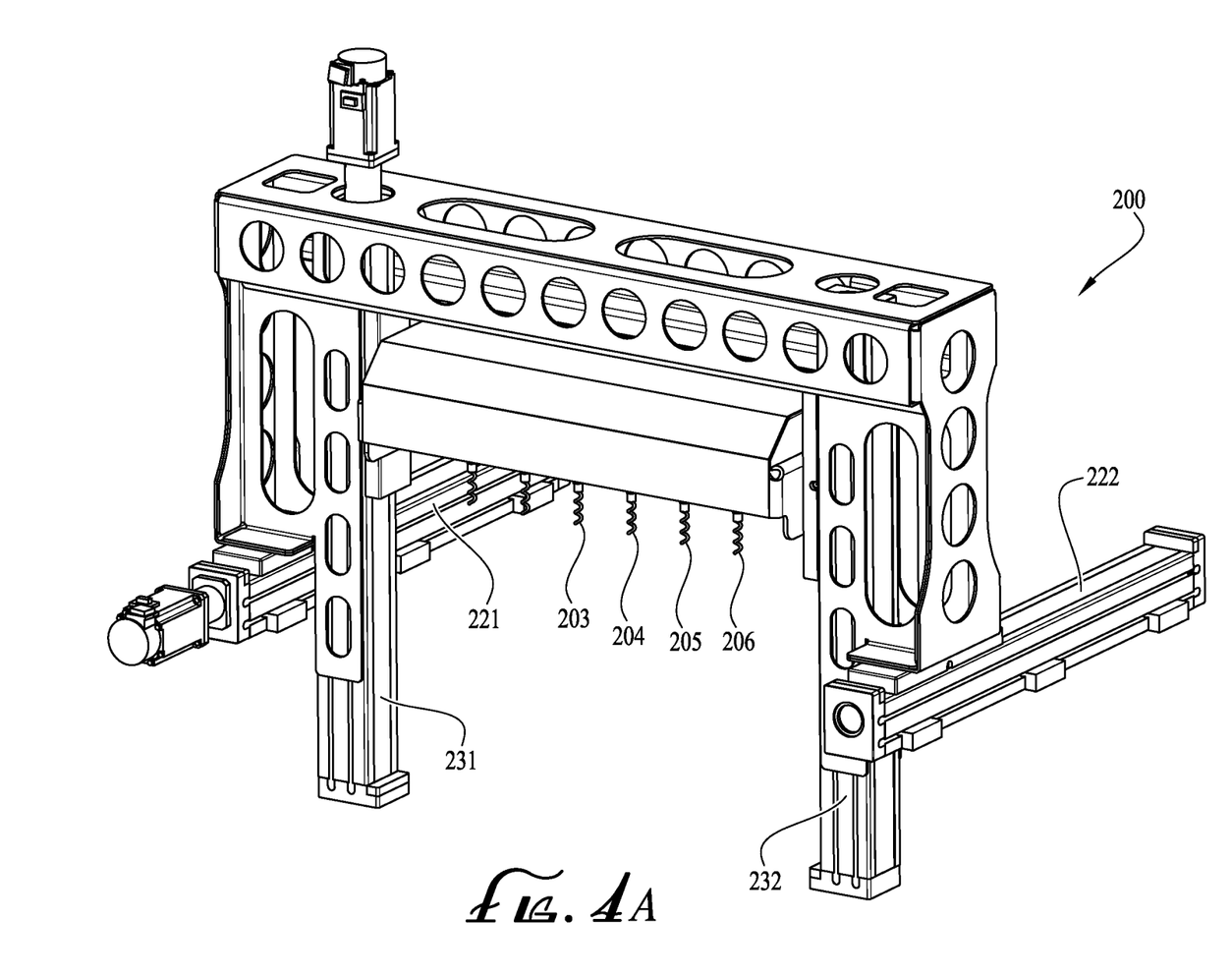
FIG. 4A is a perspective view of a grip head assembly portion of the mattress deconstruction apparatus of FIG. 1A.
Figure 4B:
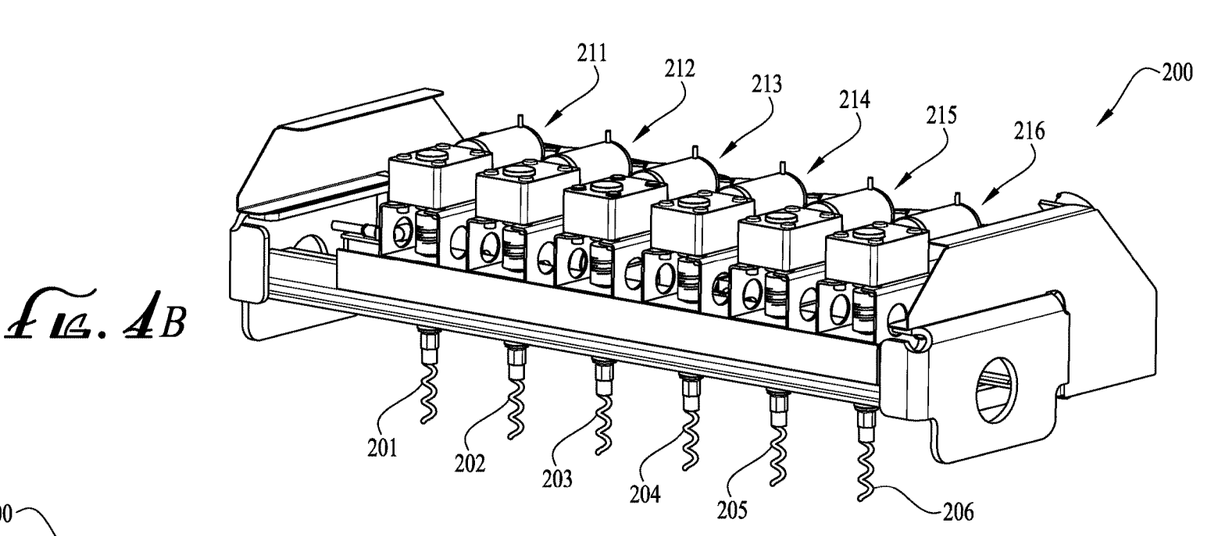
FIG. 4B is a partially exposed, perspective view of a grip head assembly portion of the mattress deconstruction apparatus of FIG. 1A, with some elements thereof removed for illustrative purposes.
Figure 4C:
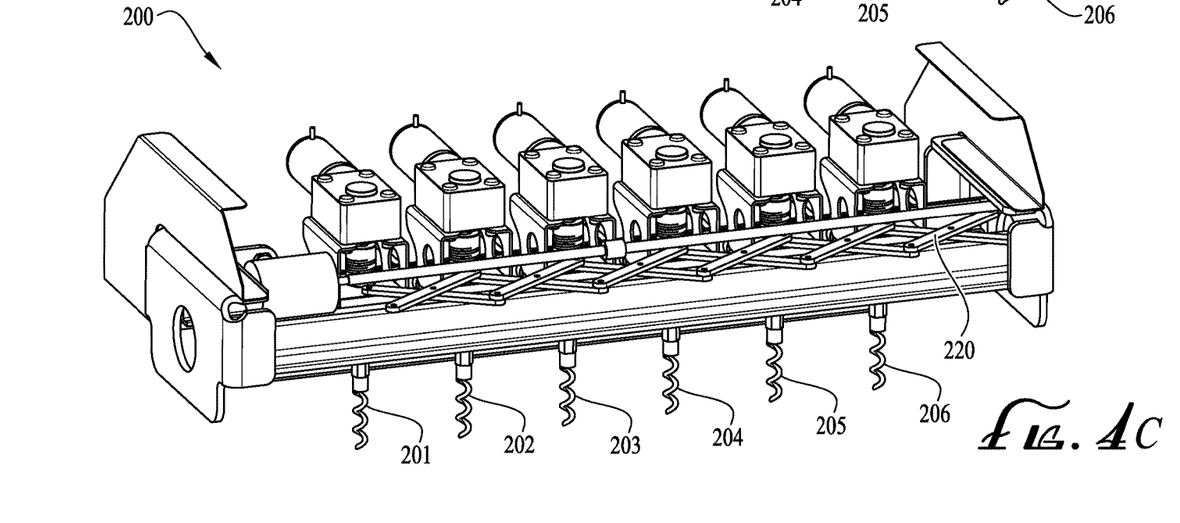
FIG. 4C is a partially exposed, perspective view of a grip head assembly portion of the mattress deconstruction apparatus of FIG. 1A, and showing a pantograph adjuster mechanism portion thereof.
Figure 5:
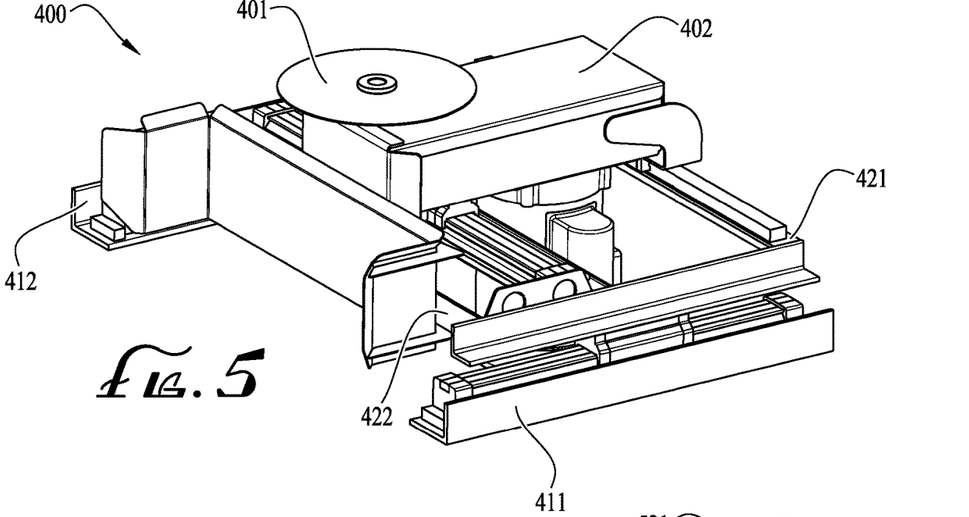
FIG. 5 is a perspective view of a movable cutter assembly portion of the mattress deconstruction apparatus of FIG. 1A.
Figure 6:
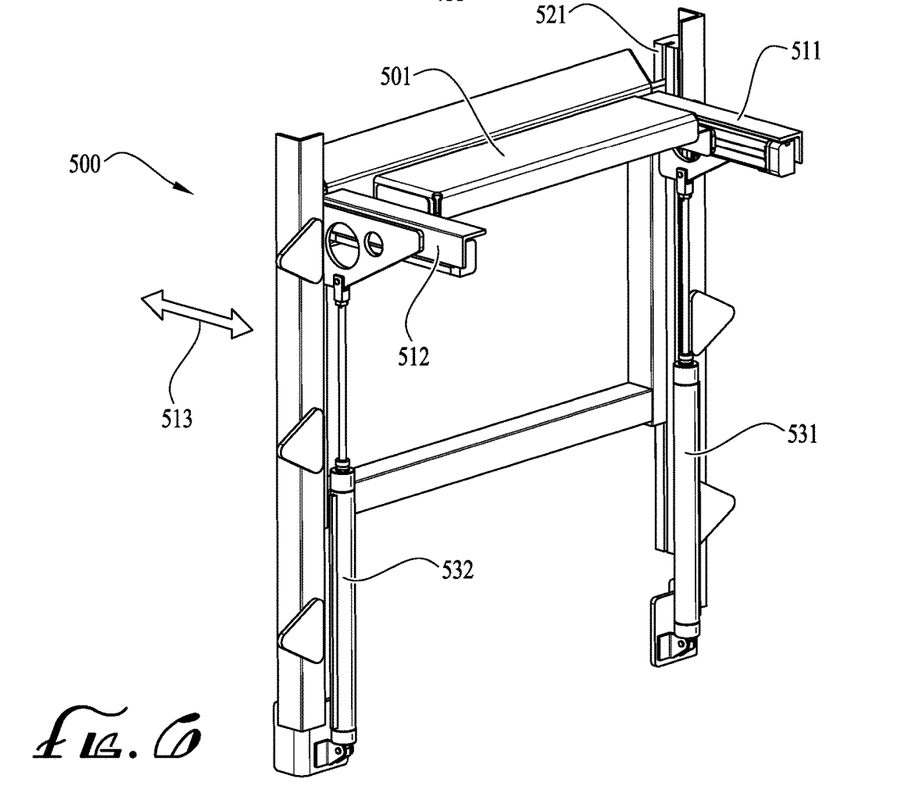
FIG. 6 is a perspective view of a movable spring extractor assembly portion of the mattress deconstruction apparatus of FIG. 1A.

Preferably, the gripper mechanism 200 includes a gang of rotatable corkscrew-like elements 201-206 (see FIGS. 4A-4C) and a plurality of drives 211-216 for driving the rotatable corkscrew-like elements 201-206 in rotation into the second end of the fabric pockets. For example, as seen in FIGS. 4A-4C, six such corkscrew-like elements 201-206 are shown. Those skilled in the art will recognize that in an apparatus for processing an entire mattress at once (and not just the portion of the mattress as shown in this example embodiment, more such corkscrew-like elements and drives can be ganged as needed.

Preferably, the gripper mechanism 200 includes horizontal rails 221 and 222 for permitting fore and aft translation along the longitudinal axis 171 of the frame. Also, the gripper mechanism 200 includes vertical posts 231 and 232 for permitting up and down movement of the gripper mechanism 200 relative to the frame 100. These rails and posts can take the form of extrusions with T-tracks formed therein, for example. The grip mechanism 200 is the device that grips the fabric pockets of the mattress during extraction of the springs and indexes the mattress to the next row. The grip mechanism 200 consists of 6 rotary screws that grip the pocket at its center, holding the pocket firmly while not binding the coil within each pocket. Each grip is free to trolley on a rail until the brake pad is engaged. This allows for many spring spacing configurations. The current demonstrator machine has four spring spacing set points, at 2.00", 2.25", 2.5", and 2.75" spacings. Settings can be added by adding gauges to the gauge mechanism 300.

The gripper mechanism 200 functions to grip the top of the fabric pocket and to maintain pocket shape for coil extraction. The inventor has found that if the shape of the pocket becomes deformed during or prior to extraction of the steel coil spring from the pocket, the steel coil spring can hang up in the fabric pocket and will resist extraction. For this reason, the inventor has found that it is preferred to maintain the shape of the pocket as much as possible during extraction. Further, through experimentation, the inventor has found that these rotatable corkscrew-like elements 201-206 are particularly well suited to gripping the fabric pockets without distorting their shape, allowing the coil springs to be removed without getting hung up in the pockets.

Preferably, rotatable corkscrew-like elements 201-206 of the gripper mechanism comprises a series of rotary rods each with an off-center sharpened point placed at the center of each coil. Preferably, the point should extend at least ¼" out from the rod and approach the fabric pocket at approximately a 45 degee angle. The rotatable corkscrew-like elements 201-206 can rotate at least 1 full revolution or some predetermined torque. Preferably, the gripper mechanism 200 should not allow back driving (worm drive).

The gauging mechanism 300 permits one to adjust the spacing the grips to match the coil spacing of the mattress being deconstructed. In one optional form, the gauging mechanism 300 includes laser-cut gauge plates (see 301 in FIG. 2A) which are specific to particular coil diameters. The gauge plates set the grip screws to a specific coil spacing during an automated gauging process. The gauge plates extend to the head while the head releases its brake and then engages the plates. The operator selects the coil size on the HMI 110 to initiate the process. Once the process is complete, the grips are set for that specific mattress and can commence processing.

However, in a more preferred form, the gauging mechanism 300 as a separate construction is eliminated. Instead, the gauging mechanism can be incorporated into the construction of the gripper mechanism. Indeed, as shown in FIG. 4C, the gripper mechanism can include a pantograph mechanism 220 for adjusting the spacing of the various corkscrew-like elements 201-206. The pantograph mechanism 220 is driven by an actuator to vary the spacing in a uniform manner so that all of the spacings between the various ones of the corkscrew-like elements are the same.

Preferably, the opener mechanism or cutter mechanism 400 is mounted to the frame 100 for longitudinal back and forth movement along longitudinal axis 171 of the frame and includes a high-speed rotating disc mounted for side to side movement across the frame in direction 172 to engage a row of fabric pockets one after another.

The opener mechanism 400 includes a "cutter" 401 in the form of a smooth high-speed circular blade-like element that opens the coil pocket, exposing the coil spring for extraction. The cutter 401 doesn't have a sharp edge and so perhaps doesn't "cut" in the traditional sense of slicing like a knife or scissors or a saw. Instead, the cutter 401 has a blunt, smooth edge and is spinning fast enough when it engages and rubs against the fabric of the fabric pocket, it creates an opening. It is believed that this is accomplished by a form of friction. Regardless of how the smooth cutter actually functions on a micro-scale, the net effect is that the fabric pocket is opened without smoke, excessive debris, or risk of fire. The cutter 401 advances longitudinally into the prepositioned row of pockets and traverses laterally across all pockets. For longitudinal movement, actuators and side rails are provided, such as side rails 411 and 412. For the transverse lateral movements, cross rails 421 and 422 are provided (along with actuators). The cutter 401 is driven by a high speed motor drive 402. Importantly, the cutter blade 401 does not cut or become entangled with the spring.

Preferably, the cutter 401 is a smooth blade that contacts coil pockets with a surface speed of approximately 200 ft/sec. The blade plunges into the fabric pockets and cuts the fabric and to the extent that it makes contact with the metal coils, it does so with no damage to the coils and without creating sparks. In this regard, the blade material can be made of non-sparking material, such as 304 stainless steel. The cutter or blade 401 functions flawlessly, perhaps due to the fact that it is not sharp, serrated, or non-concentric. Instead, it is a smooth laser-cut blade not requiring maintenance, sharpening, or scheduled replacement.

Figure 9A:
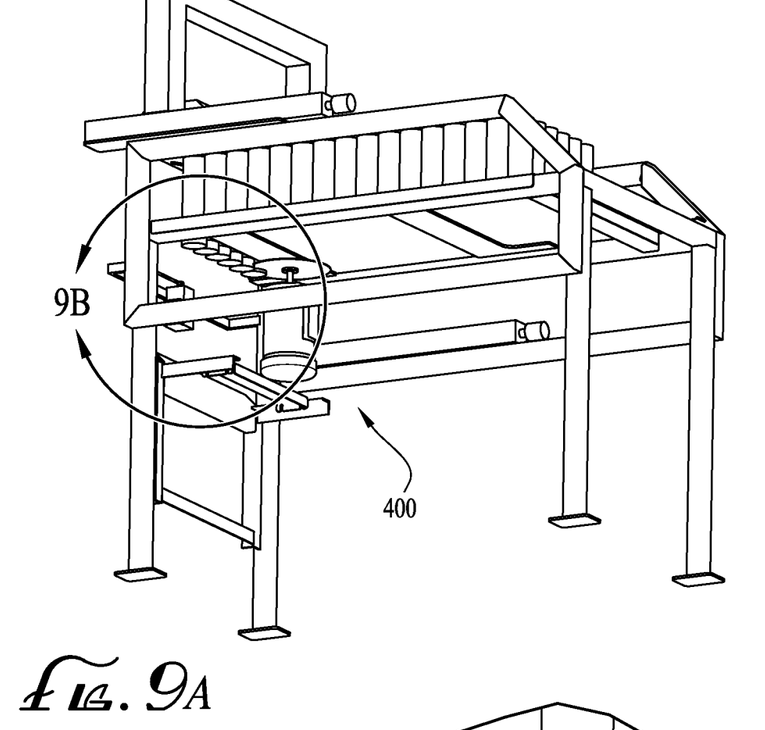
FIG. 9A is a perspective view of the mattress deconstruction apparatus of FIG. 1A shown from underneath with some elements removed for clarity of illustration and showing operation of a cutter mechanism portion thereof.
Figure 9B:
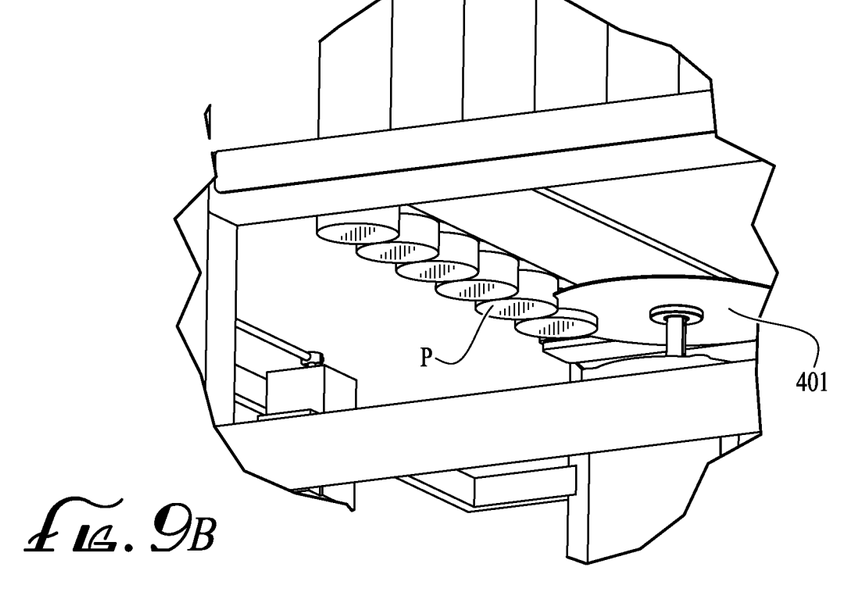
FIG. 9B is an enlargement of a portion of FIG. 9A.

FIG. 9A and FIG. 9B show operation of a cutter mechanism 400 to cut open the bottom of the fabric pockets P in the first or lead row of pockets, using the blade 401. The blade 401 is moved from one side to the other to cut the entire row of pockets P.

The pre-compressed (preloaded) steel coil spring pushes open the cap after the cut and a flap of material acting as a hinge keeps the pocket caps from falling off. The cutter 401 then retracts out of the way for the extractor mechanism 500 to do its work.

Preferably, the support platform 101 is mounted to the frame 100 for movably supporting a mattress M thereupon for processing, and the gripper mechanism 200 is mounted above the platform and the opener mechanism 400 is mounted below the platform.

The gauging mechanism 300 is provided for adjusting the spacing of the gang of rotatable corkscrew-like elements to adjust the gripper mechanism 200 to match the coil spacing of a particular mattress. Optionally, the gripper mechanism 200 or the gauging mechanism 300 includes a pantograph mechanism for adjusting the spacing of the corkscrew-like elements while keeping the spacing consistent from one corkscrew-like element to the next. For example, see the pantograph mechanism 220 of FIG. 4C.

Preferably, the extractor mechanism 500 operates to pull the steel coil springs downwardly through the openings formed in the fabric pockets by the opener mechanism 400.

Optionally, the extractor mechanism 500 includes an elongate, blade-like element 501 for engaging the steel coil springs and wherein the elongate element is mounted for movement away from the fabric pockets to pull the steel coil springs out of the fabric pockets as a group. In one example, the elongate element is a blade-like element. The extractor mechanism includes first and second rails 511, 512 for allowing the blade to be extended and retracted longitudinally along axis 513. Also, the blade can be moved up and pulled down (as for pulling the steel coil springs downwardly out of the fabric pockets) relative to stanchions, such as stanchion 521, by operation of air cylinders 531, 532.

Figure 10A:
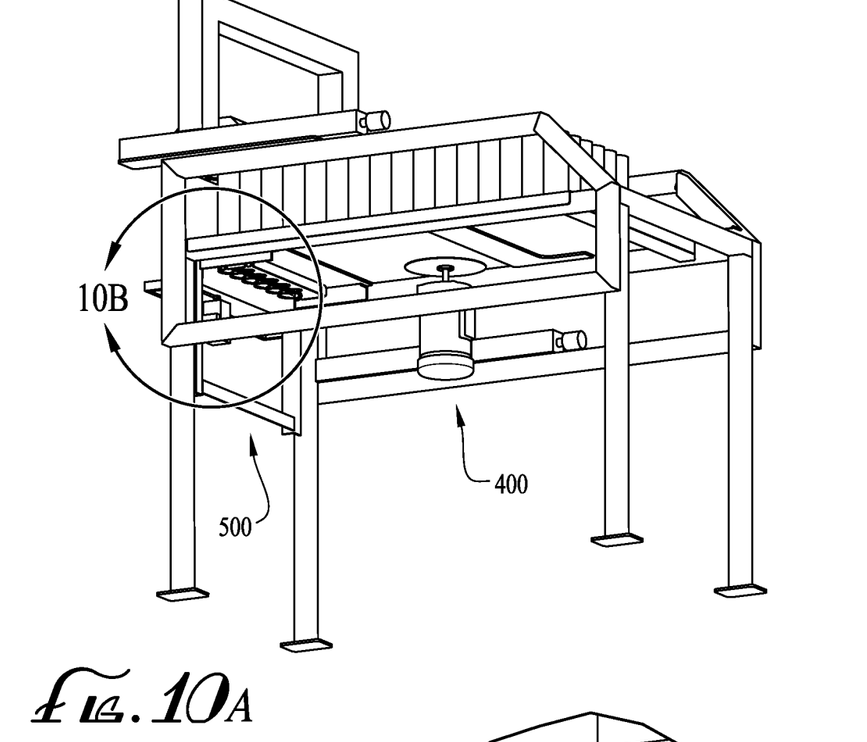
FIG. 10A is a perspective view of the mattress deconstruction apparatus of FIG. 1A shown from underneath with some elements removed for clarity of illustration and showing operation of an extractor mechanism portion thereof in a first position.
Figure 10B:
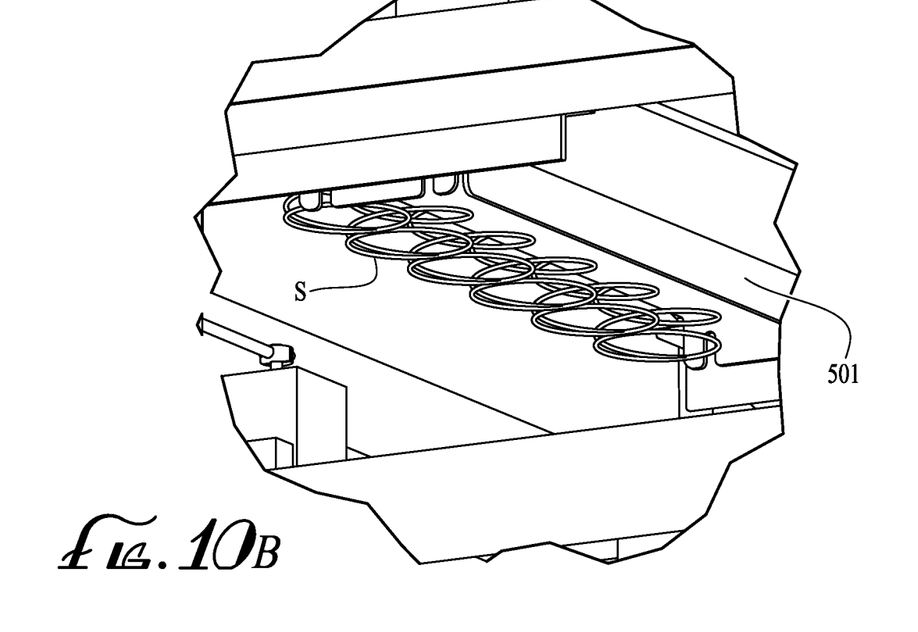
FIG. 10B is an enlargement of a portion of FIG. 10A.
Figure 11A:
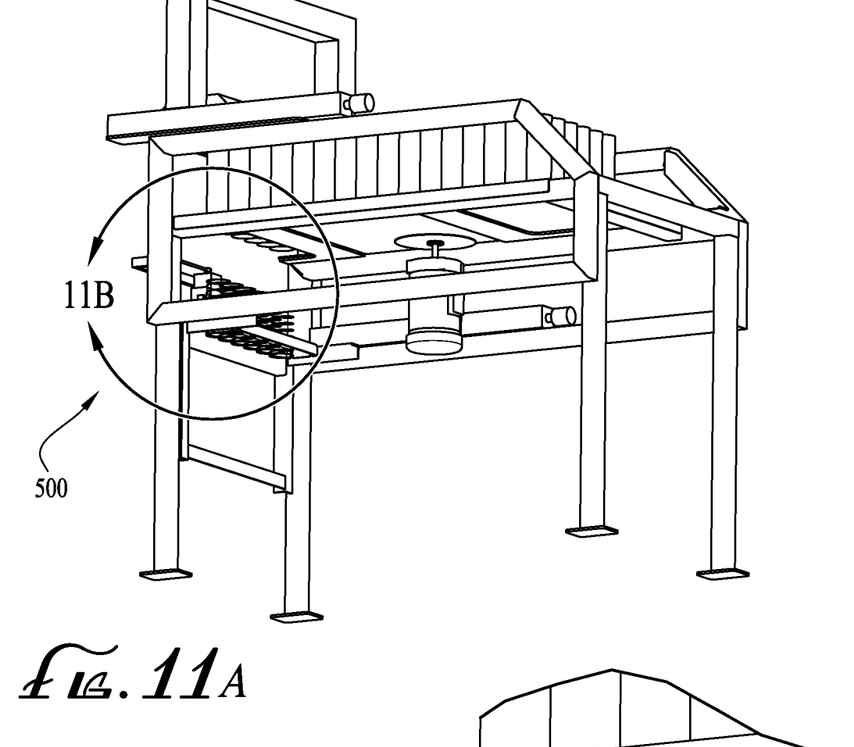
FIG. 11A is a perspective view of the mattress deconstruction apparatus of FIG. 1A shown from underneath with some elements removed for clarity of illustration and showing operation of an extractor mechanism portion thereof in a second position.
Figure 11B:
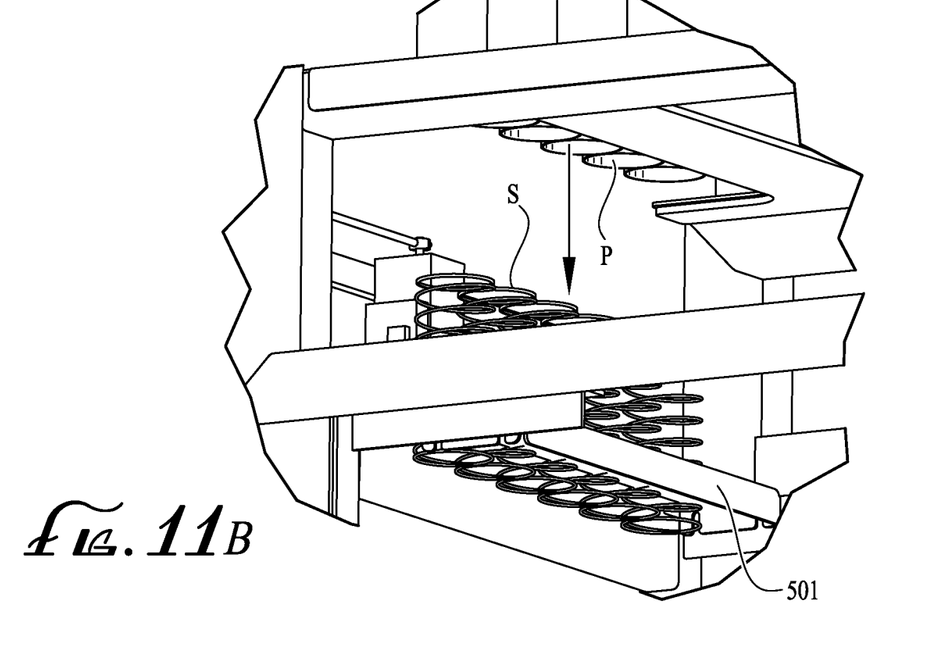
FIG. 11B is an enlargement of a portion of FIG. 11A.

FIGS. 10A-11B show operation of a retractor mechanism 500 to extract the steel coil springs S from the opened fabric pockets P (after they have been cut open at the bottom of the fabric pockets P in the first or lead row of pockets, using the blade 401). In FIGS. 10A and 10B, the retractor mechanism is shown in a raised position and with the blade 501 extended into the coil springs S. Next, as shown in FIGS. 11A and 11B, the retractor mechanism is lowered to a lower position while the blade 501 remains extended into the coil springs S, thus pulling the coil springs S downwardly and out of the fabric pockets P.

Figures 7A, 7B:
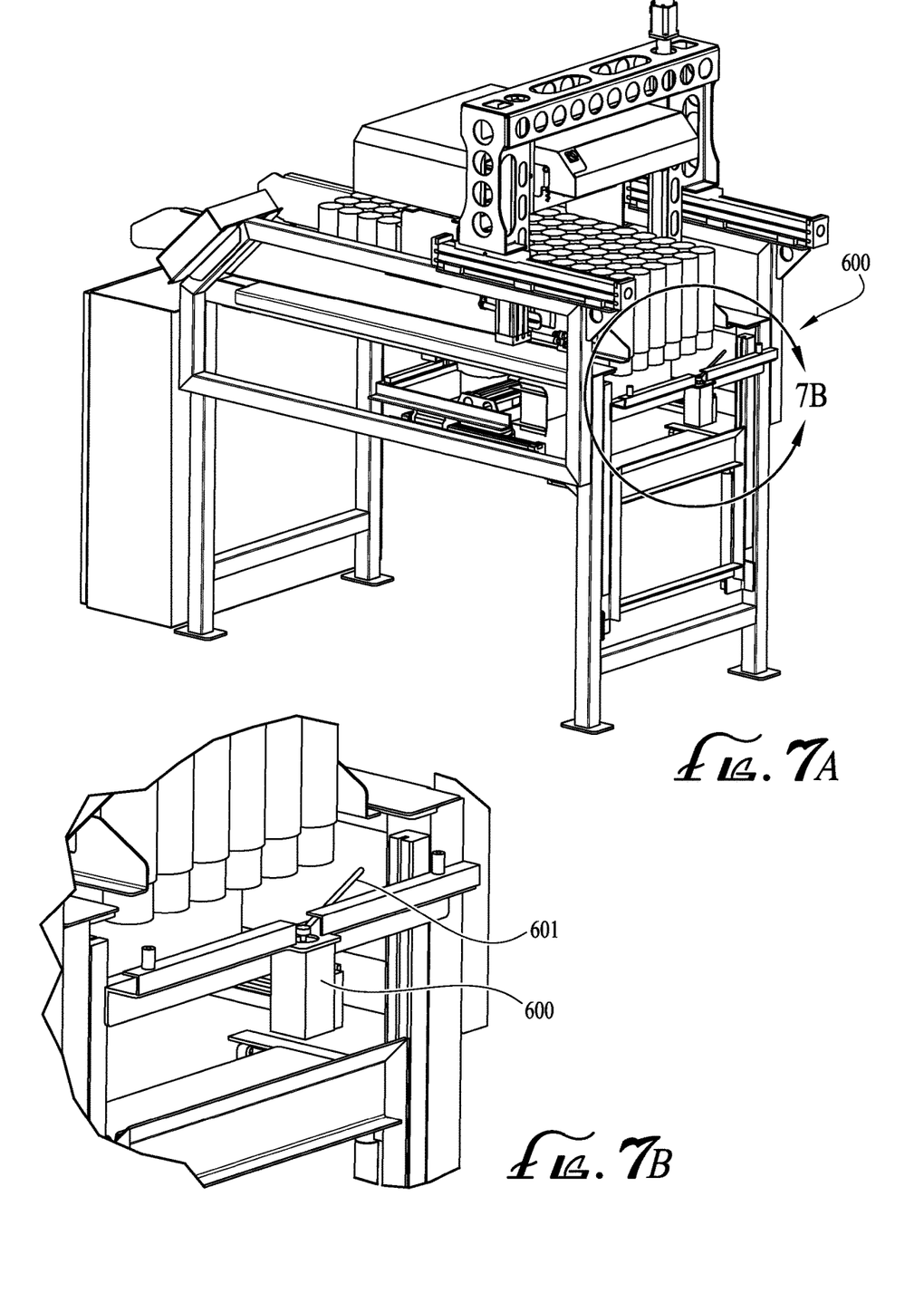
FIG. 7A is a perspective view of the mattress deconstruction apparatus of FIG. 1A showing a jam sensor portion thereof.
FIG. 7B is an enlarged perspective view of a portion of FIG. 7A and showing the jam sensor portion thereof.

Optionally, as shown in FIGS. 7A, 7B, a jam detector 600 is mounted to the frame for detecting the presence of a coil spring in a location likely to cause a jam. In one example form, the jam detector 600 includes a swinging arm 601 that sweeps through an arc to detect a steel coil spring in its path where one shouldn't be. If a jammed spring goes undetected, the machine can crash and start breaking things. Off-the-shelf detector devices (optical, laser, proximity) didn't work in this application for various reasons. This jam detector 600 includes the rod (swing arm) 601 attached to a servo motor. It simply swings through the potential jam area and if it contacts a spring, the increase in torque is sensed and generates a code. This approach worked better than any other tried. One advantage it has is that it can swing through fabric by brushing it aside without giving false indications and only detects springs where they don't belong.

The apparatus 10 includes some drive components, including 2 servo motors driving two independent rod-less ball screw actuators. This system moves the grip head into position, initiates the gauging process, indexes the mattress or workpiece or sample, prepositions for cutting, and grabs the next row of fabric pockets/coil springs for processing.

Preferably, the apparatus is configured for indexing the position of the mattress being deconstructed to present a first row of fabric pockets and steel coil springs for processing, and after removing the steel coil springs from the first row, indexing the position of the mattress again to present a subsequent row of fabric pockets and steel coil springs for processing, and continuing to process the fabric pockets and steel coil springs and indexing the position of the mattress until there are no further rows of fabric pockets and steel coil springs remaining to be processed.

Optionally, the mattress is oriented substantially horizontally during processing and the extraction of the steel coil springs from the fabric pockets is carried out by pulling the steel coil springs downwardly, out of the fabric pockets.

Figure 8:
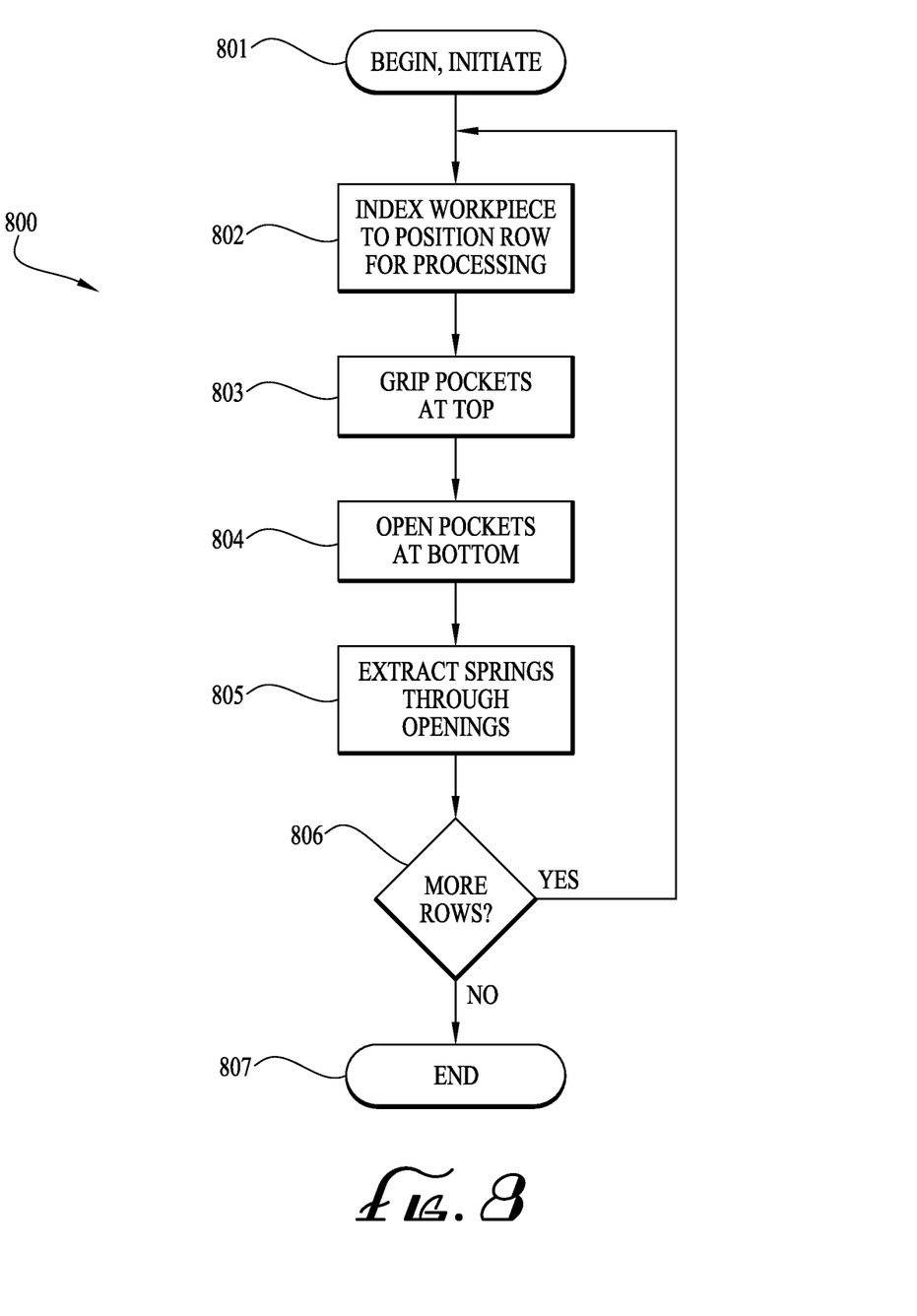
FIG. 8 is a schematic illustration of a method of operating the mattress deconstruction apparatus of FIG. 1A.

FIG. 8 is a schematic functional diagram depicting process steps according to an example method of the present invention. The process shown in FIG. 8 begins with an initiation or beginning step 801. In this initiation step 801, the machine is initiated and adjusted to match the mattress or workpiece configuration being deconstructed. For example, in this initiation step, the operator would use the human machine interface or HMI 102 to input the width of the mattress and the coil spacing or coil diameter. Next, in step 802 the workpiece or mattress is indexed into position so that the first row of coil springs and pockets is positioned for processing. Next, in step 803 the tops of the fabric pockets are gripped or grasped to secure them. Next or simultaneously with step 803, in step 804 the bottoms of the fabric pockets are opened, such as by cutting with a rotating blade. Next, in step 805, while still gripping the pockets at the top according to step 803, the springs are extracted through the openings formed in the bottom of the fabric pockets. Next, in decision step 806 it is determine whether there are additional rows of fabric pockets and coil springs that need to be separated from one another. If the answer is yes, the process reverts back to step 802. If the answer is no, the process continues on to an ending step 807 at which the machine is put into the rest position.

Advantageously, the methods and apparatuses of the present invention provide numerous benefits. For example, the method and apparatus can be implemented to operate in a rather automated process requiring minimal labor inputs. Also, the methods and apparatuses are effective to separate the steel coils from the fabric pockets, and direct the steel coils to one output and to direct the fabric pockets to a different output without cross contamination of either output material. Additionally, the methods and apparatuses are effective to produce clean and separated commodities without secondary separating processes. Also, the methods and apparatuses are effective to require significantly less power to operate (relative to shredding processes). Further, the example apparatuses have a small footprint with greater potential to integrate into existing recycling operations. Further, the methods and apparatuses are carried out and manufactured economically, which is important to the ability to recycle the materials once the mattress is deconstructed.

From experiments with a demonstration apparatus according to the present invention, certain observations were made. These include:

Inconsistency of the mattress quality construction can cause issues from wires poking through fabric, failed glue, joints, tears, and debris. These inconsistencies can cause the gripping to fail at times and that can lead to stuck coil springs. To minimize this, the operator can conduct a quality control review before loading the machine.

Coil position on the current machine is pre-set, not sensed. It could be possible to add a sensor to detect coil position to enhance the gripping capability and throughput and adjust to the actual coil.

The first and last row of pockets/springs are most difficult to cut and extract. The parameters of the machine could be set up differently for the first and last rows. Grip force, compression before cutting, and head position are examples of a few parameters that could be tweaked for first and last rows as compared to all other inner rows. Adding iterative testing and evaluating results might help also.

The gripper mechanism and gauging process was built for six (6) coils. A full-scale machine for whole mattresses might require a new gripper mechanism that holds more grippers and spaces these grippers to an appropriate spacing.

A continuous flow approach could be utilized. The reciprocating methods used in the demonstrator may increase wear and cycle times. The current process and tools could be incorporated into a flow-type methodology, avoiding group processing which compounds inconsistency and control problems.

The cutting method to open the coil pocket and expose the spring is important. It is extremely effective, inexpensive, clean, has low power consumption, and does not require sharpening or replacement. This approach results in an attached hinge requiring no post-separation of fabric from metal.

The grip method is extremely effective, clean, has low power consumption, and can be easily be replaced/serviced. This is the only method found to grip the pocket firmly without binding the spring due to deformation of the fabric pocket.

Straight line, axial extraction of springs is advantageous. If the spring is pulled axially with the coil pocket axis, minimal effort is required to extract the spring. This allows low power consumption and results in good reliability.

The quality of extracted springs and fabric are desirable and have excellent scrap value.

The demonstrator has low operating costs, low consumables, low maintenance, and low electrical requirements. This apparatus and process is very efficient compared to grinding, shredding, and post-process separation methods.

Processing coils in columns instead of rows could be done. Turning the bed sideways could help mitigate failed glue joints or inconsistent pocket spacing relative to gripping.

It is to be understood that this invention is not limited to the specific devices, methods, conditions, or parameters of the example embodiments described and/or shown herein, and that the terminology used herein is for the purpose of describing particular embodiments by way of example only. Thus, the terminology is intended to be broadly construed and is not intended to be unnecessarily limiting of the claimed invention. For example, as used in the specification including the appended claims, the singular forms "a," "an," and "the" include the plural, the term "or" means "and/or," and reference to a particular numerical value includes at least that particular value, unless the context clearly dictates otherwise. In addition, any methods described herein are not intended to be limited to the sequence of steps described but can be carried out in other sequences, unless expressly stated otherwise herein.

While the claimed invention has been shown and described in example forms, it will be apparent to those skilled in the art that many modifications, additions, and deletions can be made therein without departing from the spirit and scope of the invention as defined by the following claims.

What is claimed is:

1. An apparatus for deconstructing a mattress of the type having steel coil springs held within fabric pockets, the apparatus comprising:

a frame;

an opener mounted to the frame and operable for opening a plurality of fabric pockets at a first end thereof to create an opening in the first end of the fabric pockets and expose the steel coil springs contained therewithin;

a gripper for gripping the plurality of fabric pockets at a second end thereof, opposite the first end;

wherein the gripper comprises a gang of rotatable corkscrew-like elements and a drive for driving the rotatable corkscrew-like elements in rotation into the second end of the fabric pockets; and an extractor for extracting the steel coil springs from the fabric pockets through the openings formed in the first end of the fabric pockets.

2. The apparatus of claim 1, wherein the opener is mounted to the frame for longitudinal movement along the frame and comprises a high-speed rotating blade mounted for side-to-side movement across the frame to engage a row of fabric pockets one after another.

3. The apparatus of claim 1, wherein the extractor comprises a blade configured for engaging the steel coil springs and wherein the blade is mounted for movement away from the fabric pockets to pull the steel coil springs out of the fabric pockets as a group.

4. The apparatus of claim 1, wherein the apparatus is configured for indexing the position of the mattress being deconstructed to present a first row of fabric pockets and steel coil springs for processing, and after removing the steel coil springs from the first row, indexing the position of the mattress again to present a subsequent row of fabric pockets and steel coil springs for processing, and continuing to process the fabric pockets and steel coil springs and indexing the position of the mattress until there are no further rows of fabric pockets and steel coil springs remaining to be processed.

5. The apparatus of claim 1, further comprising a jam detector for detecting the presence of a coil spring in a location likely to cause a jam.

6. The apparatus of claim 1, wherein the mattress is oriented substantially horizontally during processing and the step of extracting the steel coil springs from the fabric pockets is carried out by pulling the steel coil springs downwardly, out of the fabric pockets.

7. The apparatus of claim 1, further comprising one or more gauge plates configured for adjusting a spacing of the gang of rotatable corkscrew-like elements to adjust the gripper to match a coil spacing of a particular mattress.

8. The apparatus of claim 7, further comprising a pantograph for adjusting the spacing of the corkscrew-like elements while keeping the spacing consistent from one corkscrew-like element to the next.

9. The apparatus of claim 1, further comprising a support platform mounted to the frame for movably supporting a mattress thereupon for processing, and wherein the gripper is mounted above the platform and the opener is mounted below the platform.

10. The apparatus of claim 9, wherein the extractor operates to pull the steel coil springs downwardly through the openings formed in the fabric pockets by the opener.

11. A method of deconstructing a mattress of the type having steel coil springs held within fabric pockets utilizing the apparatus of claim 1, the method comprising:

opening a plurality of fabric pockets at a first end thereof to create an opening in the first end of the fabric pockets and expose the steel coil springs contained therewithin;

gripping the plurality of fabric pockets at a second end thereof, opposite the first end; and extracting the steel coil springs from the fabric pockets through the openings formed in the first end of the fabric pockets.

12. The method of claim 11, wherein the step of opening the plurality of fabric pockets comprises cutting open the fabric pockets.

13. The method of claim 11, wherein the step of opening the plurality of fabric pockets comprises cutting open the fabric pockets with a high-speed rotating blade.

14. The method of claim 11, wherein the step of gripping the fabric pockets at the second end thereof is carried out after opening the fabric pockets at the first end thereof.

15. The method of claim 11, wherein the step of gripping the fabric pockets at the second end thereof is carried out before opening the fabric pockets at the first end thereof.

16. The method of claim 11, wherein the step of gripping the fabric pockets at the second end thereof comprises rotating corkscrew-like implements into the second end of the fabric pockets.

17. The method of claim 11, wherein the step of extracting the steel coil springs comprises engaging the steel coil spring with a movable element and moving the movable element away from the fabric pocket to pull the steel coil spring out of the pocket.

18. The method of claim 11, further comprising the step of indexing the position of the mattress being deconstructed to present a first row of fabric pockets and steel coil springs for processing, and after removing the steel coil springs from the first row, indexing the position of the mattress again to present a subsequent row of fabric pockets and steel coil springs for processing, and continuing to process the fabric pockets and steel coil springs and indexing the position of the mattress until there are no further rows of fabric pockets and steel coil springs remaining to be processed.

19. The method of claim 11, wherein the mattress has already had an outer cover portion thereof removed to prepare the fabric pockets and steel coil springs for processing.

20. The method of claim 11, wherein the mattress is oriented substantially horizontally during processing and the step of extracting the steel coil springs from the fabric pockets is carried out by pulling the steel coil springs downwardly, out of the fabric pockets.

\* \* \* \* \*